United States Patent
Fry

(10) Patent No.: US 7,747,253 B2
(45) Date of Patent: Jun. 29, 2010

(54) APPARATUS, AND ASSOCIATED METHOD, FOR EFFECTUATING A DATA SERVICE DESIGNATED BY A SERVICE DELIVERY MODE

(75) Inventor: George Fry, Coppell, TX (US)

(73) Assignee: Nokia Corporation, Espoo (FI)

( * ) Notice: Subject to any disclaimer, the term of this patent is extended or adjusted under 35 U.S.C. 154(b) by 1473 days.

(21) Appl. No.: 10/767,451

(22) Filed: Jan. 29, 2004

(65) Prior Publication Data

US 2005/0130648 A1 Jun. 16, 2005

Related U.S. Application Data

(63) Continuation of application No. 09/878,828, filed on Jun. 11, 2001, now Pat. No. 6,697,624.

(51) Int. Cl.
*H04W 40/00* (2009.01)
(52) U.S. Cl. .................. 455/445; 455/417; 455/414.1; 455/426.1
(58) Field of Classification Search .............. 455/445, 455/417, 414.1, 426.1
See application file for complete search history.

(56) References Cited

U.S. PATENT DOCUMENTS

| 6,044,278 | A  | * | 3/2000  | Goto et al.    | 455/422.1  |
| 6,687,356 | B1 | * | 2/2004  | Glitho et al.  | 379/201.12 |
| 6,882,860 | B1 | * | 4/2005  | Kim            | 455/553.1  |
| 7,142,895 | B2 | * | 11/2006 | Heatley        | 455/574    |

FOREIGN PATENT DOCUMENTS

| JP | 10-210151  | 8/1998 |
| JP | 2000-201227 | 7/2000 |

OTHER PUBLICATIONS

Office action in corresponding Japanese Application No. 2004-172682 dated Oct. 21, 2008.

* cited by examiner

*Primary Examiner*—Barry W Taylor
(74) *Attorney, Agent, or Firm*—Foley & Lardner LLP

(57) ABSTRACT

Apparatus, and an associated method, for facilitating routing of a data service call background and foreground service delivery modes are defined. A delivery mode type determiner determines the service delivery mode associated with the data service. If the service delivery mode is a background delivery mode, the data service is effectuated with the intended receiving station instead of being redirected pursuant to a call forwarding, or other service interaction indicia, feature.

33 Claims, 4 Drawing Sheets

APPARATUS, AND ASSOCIATED METHOD, FOR EFFECTUATING A DATA SERVICE DESIGNATED BY A SERVICE DELIVERY MODE

CROSS-REFERENCE TO RELATED APPLICATIONS

The present application is a continuation of patent application Ser. No. 09/878,828, filed on 11 Jun. 2001 now U.S. Pat. No. 6,697,624.

TECHNICAL FIELD OF THE INVENTION

The present invention relates generally to a manner by which to provide data generated pursuant to a data service to a receiving station, such as a mobile station operable in a cellular, or other radio, communication system. More particularly, the present invention relates to apparatus, and an associated method, by which the data service, designated by a service delivery mode, is selectably routed to the receiving station. Routing is dependent upon the designated service delivery mode and, selectively, also upon a service interaction indicia, such as a call forwarding or do-not-disturb indicia, associated with the receiving station. When the service delivery mode is a background mode, the data service is selectively effectuated with the receiving station irrespective of the service interaction indicia associated with the receiving station.

BACKGROUND OF THE INVENTION

Telephonic communication is a necessary adjunct of modern society. The ability to effectuate telephonic communications between two, or more, communication stations by way of a telephonic network permits telephonic communications to be effectuated between the communication stations irrespective of their respective positions. Telephonic communication permits the effectuation of both voice services and data services.

Telephonic networks have been installed throughout significant portions of the populated areas of the world. Communication stations connected to the telephonic network are used to effectuate the communication therethrough. A calling party utilizing an originating communication station initiates a communication session to be terminated with a receiving party at a receiving station. In a conventional telephonic network, initiation at the originating station of the communication service is made by the originating party entering dialing digits associated with the intended receiving station pursuant to a call request. The telephonic network interprets the dialing digits and alerts the receiving station of the call request. A receiving party positioned at the receiving station accepts the call request, such as by taking the receiving station "off-hook." The communication service is then effectuated between the originating station and the receiving station by way of the telephonic network.

More recently, cellular, and other radio, communication systems have also been installed to encompass significant portions of the populated areas of the world. The cellular communication systems include network infrastructures which are connected to conventional, wire line telephonic communication systems. A mobile station operable in a cellular, or other radio, communication system communicates by way of radio links with the network infrastructure of the cellular communication system.

A user of a mobile station is able to originate, or to receive, telephonic communications with another communication station. The other communication station can be formed of a conventional wire line station or another mobile station. Because a communication path extending to, and from, the mobile station is formed upon a radio link, wire line connections, conventionally required to connect a conventional wire line station to a telephonic network, are obviated. Increased communication mobility is, therefore, inherent in a cellular, or other radio, communication system. While a mobile station is a radio transceiver, mobile stations are generally constructed to mimic the operation of a conventional, wire line communication station. A user of a mobile station communicates telephonically in manners analogous to the manners by which a user of a conventional wire line communication station is used pursuant to a communication session.

Advancements in communications, and processing technologies, have permitted the implementation of additional features and services associated with communications effectuated by way of a telephonic network. Telephonic switches, and other control devices, are regularly constructed, for instance, to provide for specialized delivery services, such as call forwarding and do-not-disturb services. Such services are provided both in conventional wire line telephonic systems, as well as cellular, and other radio, systems. The additional features and services are generally provided pursuant to a service subscription in which the user, i.e., the subscriber, subscribes to the additional communication services pursuant to a subscription plan.

A do-not-disturb service is a call control service. When a do-not-disturb feature is activated pursuant to a service subscription, a call, intended to be terminated at the communication station associated with the subscription is not delivered to the communication station. Analogously, call forwarding services, such as call forwarding-busy (CFB), call forwarding-default (CFD), call forwarding-no answer (CFNA), and call forwarding-unconditional (CFU) are call redirection services. When a call forwarding feature is activated pursuant to a service subscription, a call, intended to be terminated at the station associated with the subscription is, instead, forwarded to another communication station. That is to say, the call requesting the effectuation of the communication service is redirected to another terminating end point.

The aforementioned services and features were initially implemented with respect to voice services. Increasingly, however, telephonic systems, both wire line systems and cellular, and other radio systems, are used to effectuate data services. While voice services are user-specific, data services are not necessarily so. Data services are, instead, sometimes communication station-specific rather than user-specific. The availability of the subscriber, or other user, of the communication station is not necessarily required for the effectuation of a data service which is communication station-specific. Conventional systems in which the do-not-disturb and call forward services are activated, however, automatically redirect a data-service call and thereby prevent delivery of the data service to the intended receiving communication station.

An improved manner by which to effectuate a data service in a communication system which provides such additional subscription services would, therefore, be advantageous.

It is in light of this background information related to the effectuation of data services in a communication system that the significant improvements of the present invention have evolved.

SUMMARY OF THE INVENTION

The present invention, accordingly, advantageously provides apparatus, and an associated method, by which to provide data generated pursuant to a data service to a receiving station, such as a mobile station operable in a cellular, or other radio, communication system.

Through operation of an embodiment of the present invention, a manner is provided by which the data service, designated by a service delivery mode, is selectably routed to the receiving station. Routing is dependent upon the designated service delivery mode and, selectably, also service interaction indicia, such as a call forwarding or do-not-disturb indicia associated with the receiving station. Selection of whether to route the data service to the receiving station or to redirect the data service to another terminating endpoint, is dependent upon the designated service delivery mode and, selectably, also service interaction indicia. Service interaction indicia include, for example, values of a call forwarding indicia or do-not-disturb indicia associated with the receiving station.

An embodiment of the present invention describes a methodology which permits background delivery of services in the presence of service interaction flags which would normally prevent the receiving station from being contacted regarding the communication service. When such flags are set, conventionally, the receiving station is not contacted regarding delivery of the communication service, and the communication service is not effectuated with the receiving station.

In one aspect of the present invention, a service delivery mode is associated with a communication service initiated by an originating station. The service delivery mode is associated with a particular communication session. Alternately, the service delivery mode is associated with the originating station, and every communication session initiated by the originating station is associated with the particular service delivery mode. Determination of the service delivery mode is made pursuant to call initiation procedures. Responsive to the determination of the service delivery mode, inquiry is selectably also made of the values of the service interaction indicia, such as values of the call forwarding and do-not-disturb service indicia. The service delivery mode associated with the communication service is of a selected one of at least two delivery modes, a background service delivery mode and a foreground service delivery mode.

A background service delivery mode is associated with a communication service in which delivery of the communication service is effectuable without the attention or interaction of a receiving party located at the receiving station. The receiving party need not be aware of the effectuation of the communication service. When a background service delivery mode is associated with the communication service, the service interaction indicia, e.g., indicia associated with call forwarding and do-not-disturb features, need not be determined, and the communication service need not be redirected to a terminating endpoint other than the intended receiving station. That is to say, some communication services are communication-station specific, rather than user-specific. By associating a background service delivery mode with the communication services which are communication station-specific, delivery of the communication service to the intended receiving station is effectuable irrespective of the availability of the receiving party to accept, or otherwise take delivery of, the communication service.

A foreground delivery service mode is also defined. Communication services which require the acceptance of, or interaction with, the receiving party, remain constrained by the service interaction indicia values. That is to say, when a communication service is user-dependent, normal call forwarding and do-not-disturb procedures are followed. That is, when a communication service requires foreground delivery, determination is made of the service interaction indicia values to determine whether the service interaction features are activated. If so, the communication service is redirected to another terminating endpoint or the communication service is not effectuated.

In another aspect of the present invention, additional service delivery modes are defined. A maintenance mode is associated with certain communication services which, when effectuated, function to maintain the receiving station. Because such a communication service is communication station-specific, when the service delivery mode is identified to be a maintenance delivery mode, the communication service is effectuated with the intended receiving station irrespective of the setting of the service interaction indicia. Analogously, a diagnostic service delivery mode is also defined. A diagnostic service delivery mode is also a communication station-specific mode. That is, when a communication service is designated by a diagnostic delivery mode, the communication service is effectuated with the intended receiving station irrespective of the values of the service interaction indicia. Additional service delivery modes can analogously be further defined.

Through definition of a background service delivery mode and a foreground service delivery mode, a receiving party, network operator, and a service provider are all able to discriminate which services are to be delivered to the receiving station or other terminating endpoint. Improved communications in a communication system in which an embodiment of the present invention is implemented are possible as communication services are selectively effectuable with an intended receiving station in a background mode without interaction with a receiving party.

In one implementation, service delivery modes are defined in a cellular or PCS (personal communication service) and associated with communication services to be effectuated with a mobile station operable therein. When a background service delivery mode is associated with the communication service, the communication service is effectuated with the receiving station, i.e., the mobile station, irrespective of whether a receiving party is available at the mobile station to accept delivery, and effectuation, of the communication service. A foreground service delivery mode is also defined. When a foreground delivery mode is associated with a communication service, determination is further made as to whether a service interaction indicia is activated, such as a call forwarding or a do-not-disturb feature. Responsive to the actuation of the service interaction feature, routing of the communication service is redirected or terminated, as appropriate, if the receiving party is unable to accept the communication service.

In these and other aspects, therefore, apparatus, and an associated method, is provided for a communication system having an originating station at which a data-service call is originated. The data service call is to be terminated at an intended terminating station. Routing of the data service call to a terminating endpoint is selectably facilitated. The terminating endpoint is selected responsive to at least a delivery mode type. A delivery mode type determiner is operable responsive to detection of initiation of the data service call. The delivery mode type determiner determines, with respect to the intended terminating station, the delivery mode type associated with the data service call. A call delivery director is coupled to the delivery mode type determiner. The call delivery director directs the data service call to the terminating endpoint. The terminating endpoint is formed of the intended terminating station when the delivery mode type determined by the delivery mode type determiner comprises a background mode delivery type.

A more complete appreciation of the present invention and to the scope thereof can be obtained from the accompanying drawings which are briefly described below in the following detailed description of the presently preferred embodiments of the invention, and the appended claims.

DETAILED DESCRIPTION OF THE DRAWINGS

Figure 1:
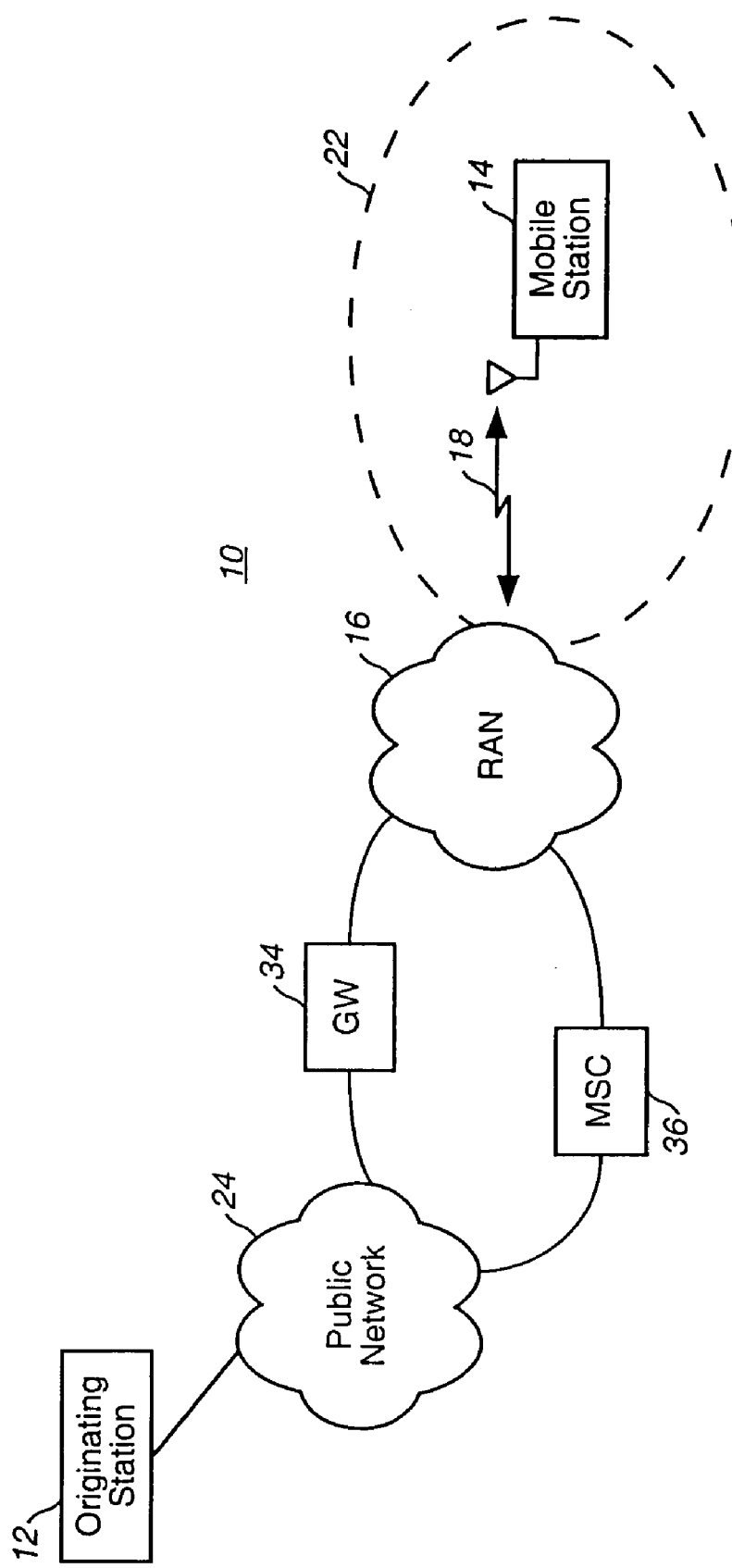
FIG. 1 illustrates a functional block diagram of an exemplary communication system in which an embodiment of the present invention is implemented.

Referring first to FIG. 1, a communication system, shown generally at 10, is operable to effectuate a data service pursuant to a communication session between an originating station 12 and an intended receiving station, here a mobile station 14. In the exemplary implementation shown in the figure, the mobile station 14 is operable pursuant to the so-called 2G, 2.5G, and 3G (third generation) cellular communication systems which provide for the communication of data which effectuates performance of a data service. In other implementations, the mobile station is operable in other cellular, and other radio, communication systems. And, in another implementation, the receiving station, here formed of the mobile station 14, is, instead, formed of a wire line communication station.

The communication system includes a network portion including a radio part, here formed of a radio access network (RAN) 16. The radio access network is also generally operable pursuant to the 2G, 2.5G, and/or 3G cellular communication standard, thereby to be operable to communicate with the mobile station 14 by way of the radio link 18.

Elements of the radio access network 16 define cells which form coverage areas within which communications with mobile stations, such as the mobile station 14, are permitted. In the figure, a single cell 22 is shown. In an actual implementation, a large number of cells are defined by the radio access network.

The communication system further includes a public network 24, here representative of a PSTN (public-switched telephonic network) and PDN (packet data network), such as the internet backbone. The public network is connected to the radio access network by way of a gateway (GW) 34 and a mobile switching center (MSC) 36. The mobile switching center is utilized for circuit switched connections, and the gateway 34 is utilized for packet-switched connections.

In the exemplary implementation shown in the figure, the originating station 12 is coupled to the public network 24. And, a communication path is formable between the originating station and the mobile station by way of the gateway or mobile switching center, the radio access network, and the radio link, thereby to permit a data service originated at the originating station to be delivered to the mobile station forming the receiving station. Communications originated at the mobile station to be delivered to the station 12 are also communicated upon the same communication path. And, while for some purposes of explanation, description of exemplary operation of an embodiment of the present invention shall be with respect to communications originated at the station 12, communications can analogously be originated at the mobile station 14.

Figure 2:
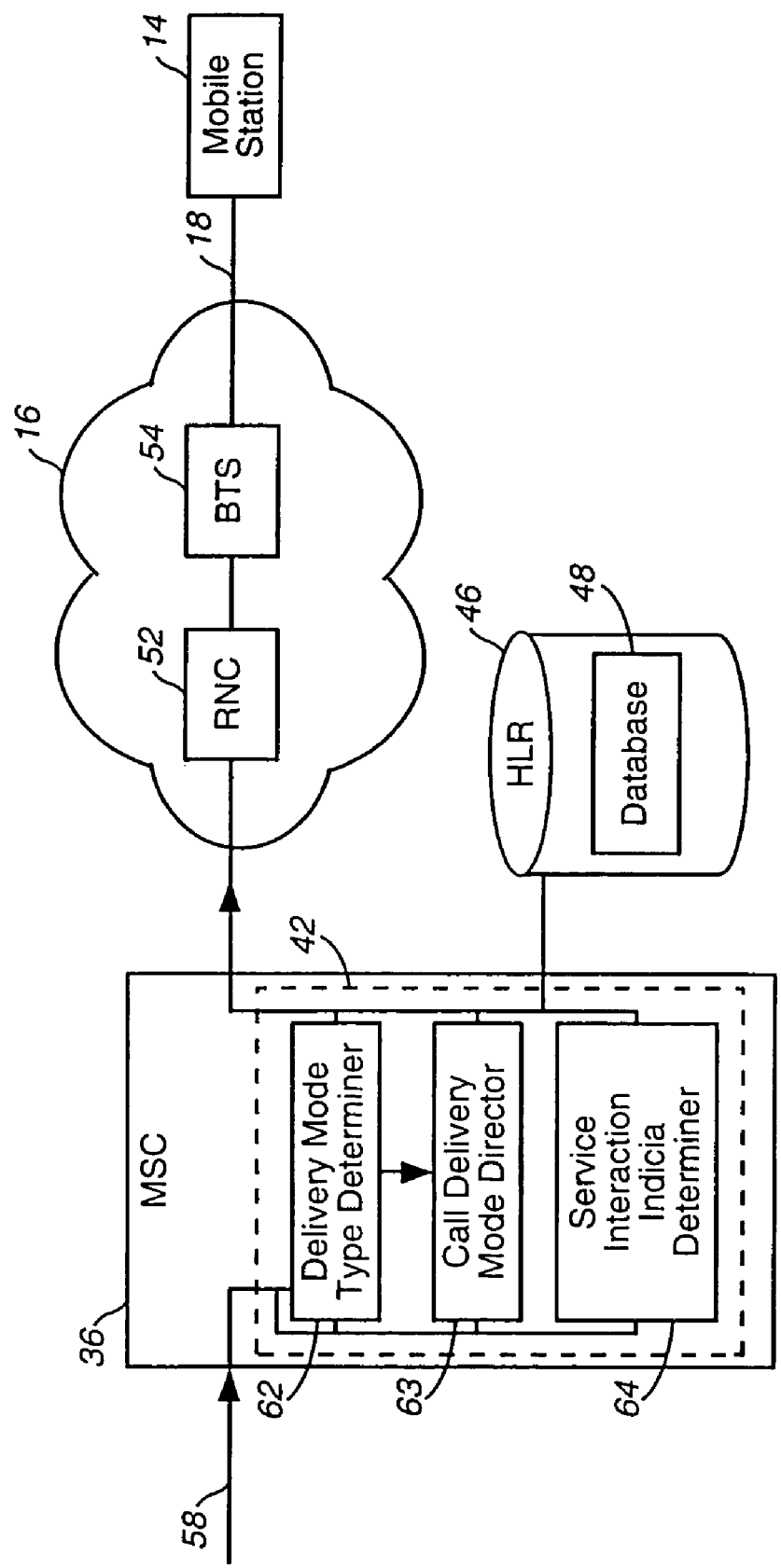
FIG. 2 illustrates a functional block diagram of a portion of the communication system shown in FIG. 1.

FIG. 2 illustrates portions of the communication system 10 illustrating the elements forming the apparatus 42 of an embodiment of the present invention. The elements are functionally represented and here are located at the mobile switching center 36. In other implementations, the elements are alternately positioned elsewhere, such as within the radio access network, or distributed at both the mobile switching center and the radio access network, as well as elsewhere.

The mobile switching center is coupled to a home location register (HLR) 46 which includes a database 48 of an embodiment of the present invention.

The mobile switching center is also coupled to a plurality of radio network controllers (RNC), of which a single RNC 52 is shown in the Figure, which are embodied at the radio access network 16. The radio network controller controls operation, for instance, of a plurality of base transceiver stations, also of which a single base transceiver station (BTS) 54 is shown in the figure. The connection of the mobile station 14 to a base transceiver station upon a radio link 18 is here indicated by the commonly-referenced segment 18. And, the arrow 58 is representative of a request generated by an originating station (e.g., the originating station 12 shown in FIG. 1) to initiate effectuation of a data service with the intended receiving station, here formed of the mobile station 14 as well as the data which is to be communicated to the mobile station pursuant to effectuation of the data service.

In one implementation, as part of the request generated on the line 58, the originating station provides an indication of a service delivery mode by which the data service of the request is to be delivered. The service delivery mode is a selected one of at least two different types of service delivery modes, a background delivery mode and a foreground delivery mode. A background delivery mode is a mode which permits effectuation of a data service with a receiving station irrespective of the availability of a receiving party to accept delivery of a data service. Conversely, a foreground delivery mode is associated with a data service associated more with the receiving party than the receiving station to which the data service is initially requested to be routed. That is to say, a data service associated with a background delivery mode may be communication station-specific, while a data service associated with a foreground delivery mode is user-specific.

In a further implementation, additional service delivery modes are defined. A maintenance delivery mode is designated when a data service, when effectuated, performs maintenance upon a receiving station. A diagnostic delivery service mode is associated with a data service which, when effectuated, performs a diagnostic service at the receiving station. Both the maintenance and the diagnostic modes are similar to a background service delivery mode in that the data service is a communication station-based service. Analogous to delivery of a data service designated by a background service delivery mode, a data service designated by a maintenance service delivery mode or by a diagnostic service delivery mode is able to be delivered to the receiving station irrespective of the availability of the receiving party at the receiving station.

The apparatus 42 of an embodiment of the present invention is positioned at a control center, here formed of the mobile switching center 36, includes a delivery mode type determiner 62 coupled to the line 58 to detect indications of the service delivery mode associated with the data service initiated by an originating station. In one implementation, the designation of the background delivery service mode is contained in the call request. That is, the designation forms part of the call request and such indication of the designation is provided by the originating station. In another implementation, the designation of the delivery service mode is associated with the identity of the originating station. And, in another implementation, the delivery service mode to be associated with the originating station is selected by the receiving station. In implementations in which the service delivery mode is associated with the originating station rather than a particular data service, the designation is stored at a database such as the database 48, or other internal or external database accessed by the MSC 42, and indexed together with indicia identifying the originating station. That is, the database 48 is here shown to be located at an HLR (home location register). In other implementations, the database is located elsewhere and accessible by the MSC. For instance, in another implementation, the database is positioned at an entity coupled to the public network 24.

If the determiner 62 determines the request for initiation of the data service to be a background service delivery mode, a maintenance service delivery mode, or a diagnostic service delivery mode, call set-up procedures continue with the intended receiving station and the data service is effectuated with the intended receiving station. If one or more service interaction flags are set, the intended receiving station is instructed, through appropriate means, not to produce an audible or other alert to the user. The mobile station is formed pursuant to the page message, or pursuant to a service negotiation procedure, that a background service is requested. Because a background service is requested, the user of the mobile station is not alerted, such as through generation of an audible tone, of the request. If, conversely, the determiner 62 determines the data service to be designated to be effectuated in a foreground service delivery mode, the availability of the receiving party at the receiving station to accept delivery of the data service is required.

Responsive to the initiation of the request, a page message is generated and routed to the receiving station. A call delivery director 63 is operable, responsive to determinations made by the determiner 62 to cause generation of the page message and other call set-up procedures. If a page response does not indicate that the receiving party is located at the intended receiving station to accept delivery of the data service, a service interaction indicia determiner 64 is operable to determine the settings of service interaction flags associated with the receiving station. Service interaction indicia is associated, for instance, with call forwarding and do-not-disturb features to which a receiving party subscribes pursuant to a service subscription plan. The call forwarding features include, for instance, call forwarding-busy (CFB), call forwarding-default (CFD), call forwarding-no answer (CFNA), and call forwarding-unconditional (CFU) features. Responsive to values of the service interaction indicia, the call request is selectably routed to another terminating endpoint, such as another receiving station or a store and forward location.

Thereby, by defining a service delivery mode with the data service, improved communications in the communication system are possible. Because a background service delivery mode is defined, delivery of a data service to an intended receiving station is permitted even in the event that a receiving party is unable to accept delivery of the data service and the service interaction indicia indicates that a normal call request would be rerouted to another terminating endpoint.

Figure 3:
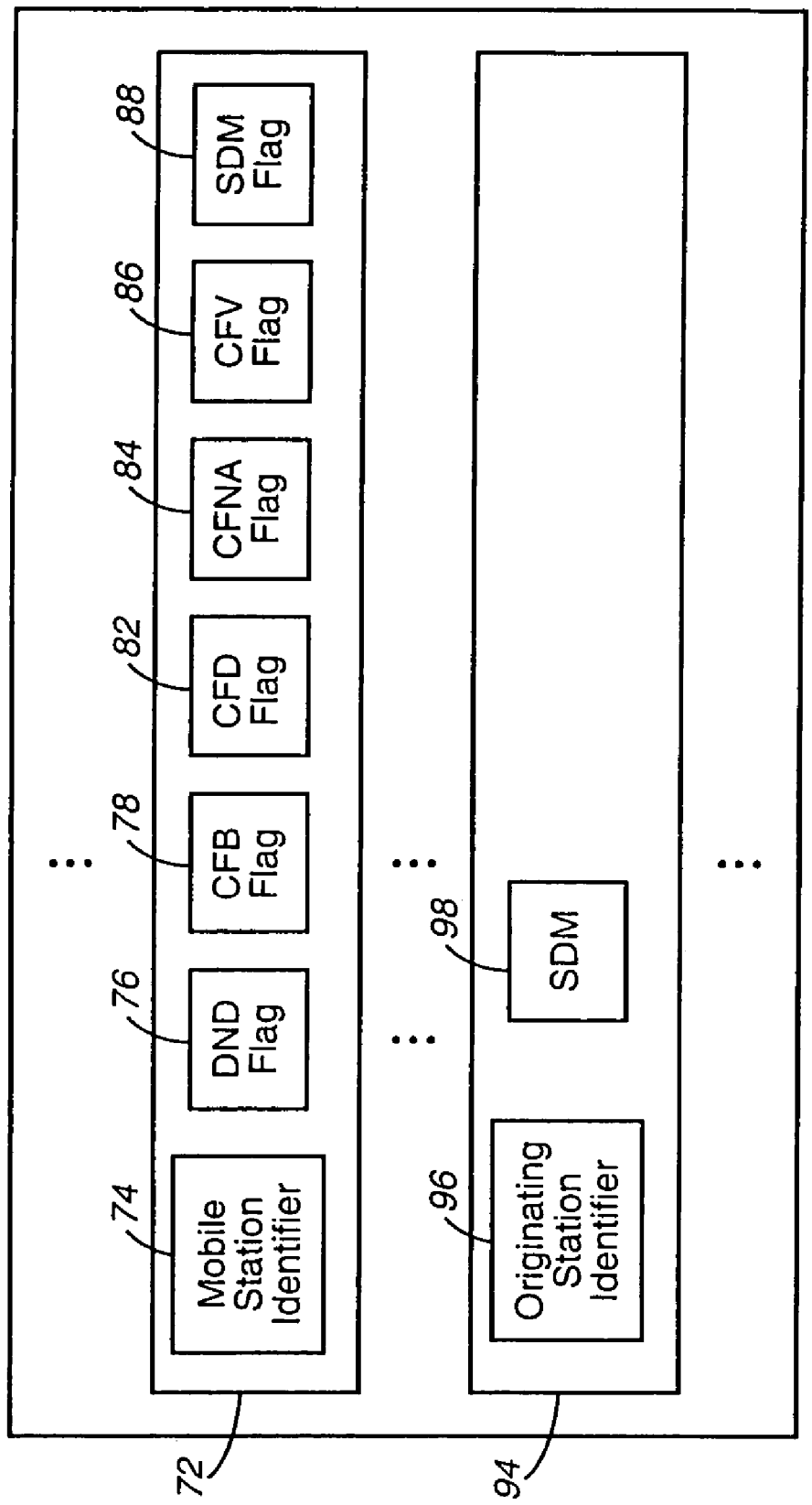
FIG. 3 illustrates an exemplary data base created and accessed during operation of an embodiment of the present invention.

FIG. 3 illustrates the database 48 maintained, here, at a home location register 46 (shown in FIG. 2). Here, a first exemplary database entry 72 is shown. The database entry identifies an identity of a receiving station, here a mobile station identifier 74. Indexed together with the identifier are flag settings 76, 78, 82, 84, and 86. The flag settings correspond to do-not-disturb, CFB, CFD, CFNA, and CFU settings selected by a receiving party associated with the mobile station pursuant to a service subscription.

When a call request is made to effectuate a data service in which the service delivery mode comprises a foreground mode, values of the flag settings are determined by the service interaction indicia determiner when the call set-up can be effectuated with the intended receiving station. The entry 72 here further includes a service delivery mode flag 88 associated with an originating station. In an implementation in which the receiving station determines the service delivery mode to be associated with an originating station, the service delivery mode associated with the originating station is identified in the database.

The database here includes another exemplary database entry 94, here indexing together an originating station identification 96 and a service delivery mode 98 to be associated therewith. Such a database entry is used when a service delivery mode is associated with every data service provided by an originating station.

Figure 4:
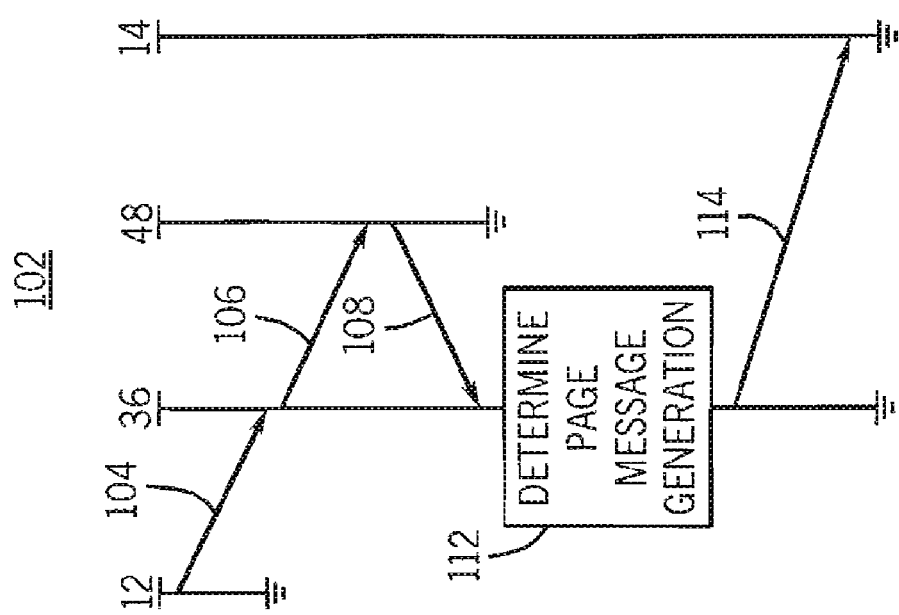
FIG. 4 illustrates a message sequence diagram illustrating the signaling generated during operation of an embodiment of the present invention.

FIG. 4 illustrates a message sequence diagram, shown generally at 102, representative of signaling generated during operation of the communication system 10 shown in FIGS. 1 and 2. When a data service originated by an originating station 12 is to be effectuated with a receiving station, here the mobile station 14, a request, such as a call request, is generated, indicated by the segment 104, by the originating station. The request is routed through the network of the communication system to the mobile switching center 36, or other control center. Once received, determination is made of the service delivery mode associated with the request. An indication of the service delivery mode, in one implementation, is contained in the request. In other implementations, the determination of the service delivery mode requires access to a database at which such information is stored.

Determination of values of the service interaction indicia, such as whether call forwarding or do-not-disturb features are activated, is also made. Inquiry is made of the database 48, located at the HLR, or elsewhere to determine the values. The inquiry to the database is indicated by the segment 106. And the segment 108 indicates the response to the inquiry.

Once the service delivery mode and the values of the service interaction indicia are known, a determination, indicated by the block 112, is made as to whether a page message should be generated to the mobile station. The page message includes indication of the service delivery mode. The transmission of the page message is indicated in the Figure by the segment 114.

Figure 5:
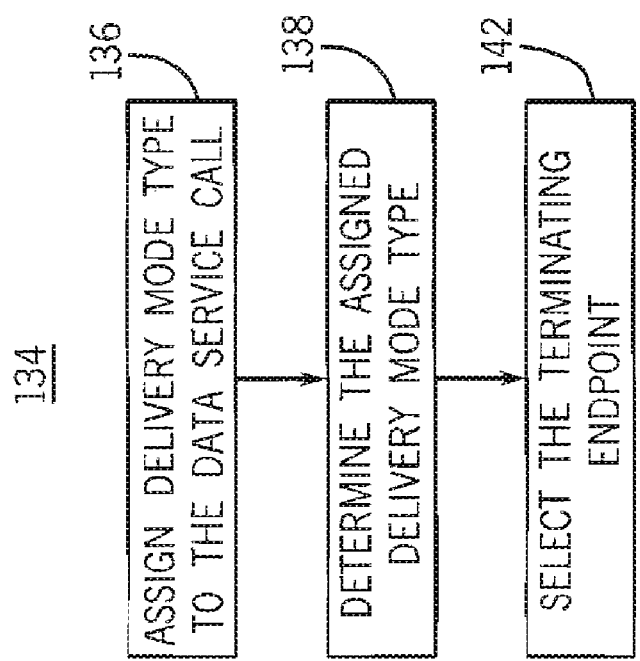
FIG. 5 illustrates a method flow diagram listing the method of operation of the method of an embodiment of the present invention.

FIG. 5 illustrates a method flow diagram, shown generally at 134, of an embodiment of the present invention. The method 134 facilitates routing of a data service call to a terminating endpoint. And, as indicated by the block 136, a delivery mode type is assigned to the data service call. Then, and as indicated by the block 138, the delivery mode type assigned to the data service call is determined.

Thereafter, and as indicated by the block 142, a terminating endpoint to which to direct the data service call is selected.

The terminating endpoint is formed of the intended terminating station when the delivery mode type is a background mode delivery type.

Thereby, improved communications in a communication system are possible as a data service call need not be redirected to a terminating endpoint other than the intended receiving station if the service delivery mode is a background mode.

The preferred descriptions are of the preferred examples for implementing the invention, and the scope of the invention should not necessarily be limited by this description. The scope of the present invention is defined by the following claims.

The invention claimed is:

1. A method of effectuating a data service in a communication system comprising:
   receiving a request for said data service, the request indicating a service delivery mode associated with the data service; and
   routing said data service based on said service delivery mode, wherein said service delivery mode is selected from the group consisting of:
   a background service delivery mode,
   a diagnostic service delivery mode,
   a maintenance service delivery mode, and
   a foreground service delivery mode.

2. The method as recited in claim 1 wherein a terminating endpoint to which said data service is routed is selected from the group consisting of:
   an intended receiving station of said data service,
   a terminating station, and
   a store and forward location.

3. The method as recited in claim 2 wherein said terminating endpoint is said intended receiving station if said service delivery mode is a background service delivery mode, a diagnostic service delivery mode, or a maintenance service delivery mode.

4. The method as recited in claim 1 wherein said request includes an indication of said service delivery mode, and wherein said associating includes employing said indication to associate said service delivery mode with said data service.

5. The method as recited in claim 1 wherein said associating includes obtaining said service delivery mode from a database based on an identity of an originating station from which said data service is effectuated.

6. The method as recited in claim 1 wherein said associating includes determining said service delivery mode based on an intended receiving station of said data service or an originating station from which said data service is effectuated.

7. The method as recited in claim 1 further comprising; obtaining service interaction indicia associated with an intended receiving station of said data service; and wherein said routing further includes routing said data service based on said service interaction indicia and said service delivery mode.

8. The method as recited in claim 7 wherein said service interaction indicia is selected from the group consisting of:
   a call-forwarding-busy,
   a call-forwarding-default,
   a call-forwarding-no answer,
   a call-forwarding-unconditional, and
   a do-not-disturb.

9. The method as recited in claim 1 wherein said routing further includes:
   obtaining service interaction indicia associated with an intended receiving station of said data service,
   generating an acceptance request to said intended receiving station, and
   routing based on a response to said acceptance request and said service interaction indicia, if said service delivery mode is a foreground service delivery mode.

10. The method as recited in claim 9 wherein a terminating endpoint to which said data service is routed is said intended receiving station if said response indicates acceptance of said data service.

11. A method of initiating a data service from an originating station comprising:
    generating a data service request, wherein said request includes an indication of a service delivery mode associated with said data service, and wherein said service delivery mode is selected from the group consisting of:
    a background service delivery mode,
    a diagnostic service delivery mode,
    a maintenance service delivery mode, and
    a foreground service delivery mode.

12. A method of receiving a data service at a receiving station comprising:
    receiving an indication of delivery of said data service, wherein said indication includes a service delivery mode;
    receiving said data service; and
    processing said data service in a manner based on whether the service delivery mode is a background service delivery mode, a maintenance service delivery mode, a diagnostic service delivery mode, and a foreground service delivery mode.

13. The method as recited in claim 12 wherein said processing includes not alerting the user of the receiving station if said service delivery mode is a background service delivery mode, a maintenance service delivery mode, or a diagnostic service delivery mode.

14. The method as recited in claim 12 further comprising:
    receiving instructions from a communication system from which said data service is received regarding not alerting a receiving party at said receiving station about delivery of said data service; and wherein said processing includes processing said data service responsive to said instructions.

15. A method of receiving a data service at a receiving station comprising:
    receiving an indication of delivery of said data service, wherein said indication includes a service delivery mode, and wherein said service delivery mode is selected from the group consisting of:
    a background service delivery mode,
    a diagnostic service delivery mode,
    a maintenance service delivery mode, and
    a foreground service delivery mode; and
    requesting a response regarding acceptance of said data service from a user of said receiving station, if said service delivery mode is a foreground service delivery mode.

16. The method as recited in claim 15 wherein said requesting further includes transmitting said response to a communications system in which said receiving station operates.

17. The method as recited in claim 15 wherein said requesting further includes transmitting an indication of said response to a communications system in which said receiving station operates.

18. An apparatus for effectuating a data service comprising:
    a delivery mode determiner configured to associate a service delivery mode with said data service based on an indication of the service delivery mode within a request for effectuation of said data service; and
    a call delivery director, configured to conduct call set-up procedures and route said data service based on said service delivery mode, wherein said service delivery mode is one selected from the group consisting of:
a background service delivery mode,
a diagnostic service delivery mode,
a maintenance service delivery mode, and
a foreground service delivery mode.

19. The apparatus as recited in claim 18 wherein a terminating endpoint to which said data service is routed is selected from the group consisting of:
an intended receiving station of said data service,
a terminating station, and
a store and forward location.

20. The apparatus as recited in claim 19 wherein said terminating endpoint is said intended receiving station if said service delivery mode is a background service delivery mode, a diagnostic service delivery mode, or a maintenance service delivery mode.

21. The apparatus as recited in claim 18 wherein said request includes an indication of said service delivery mode, and wherein said delivery mode determiner is further configured to employ said indication to associate said service delivery mode with said data service.

22. The apparatus as recited in claim 18 further comprising:
a database comprising a plurality of database entries, each of said database entries contains an originating station identifier and an associated service delivery mode; and
said delivery mode determiner is further configured to obtain said associated service delivery mode from said database based on an identity of an originating station from which said data service is effectuated and employ said associated service delivery mode as said service delivery mode.

23. The apparatus as recited in claim 18 further comprising:
a database comprising a plurality of database entries, each of said database entries contains a receiving station identifier and associated service interaction indicia;
a service interaction indicia determiner configured to determine service interaction indicia values from said associated service interaction indicia obtained from said database based on an identity of an intended receiving station of said data service; and
wherein said call delivery director is further configured to route said data service based on said service interaction indicia.

24. The apparatus as recited in claim 23 wherein said service interaction indicia is selected from the group consisting of:
a call-forwarding-busy, a call-forwarding-default,
a call-forwarding-no answer,
a call-forwarding-unconditional, and
a do-not-disturb.

25. The apparatus as recited in claim 18 further comprising:
a database comprising a plurality of database entries, each of said database entries contains a receiving station identifier and associated service interaction indicia;
a service interaction indicia determiner configured to determine service interaction indicia values from said associated service interaction indicia obtained from said database based on an identity of an intended receiving station of said data service; and
wherein said call delivery director is further configured to generate an acceptance request to said intended receiving station and to route said data service based on said service interaction indicia and a response to said acceptance request, if said service delivery mode is a foreground service delivery mode.

26. The apparatus as recited in claim 25 wherein a terminating endpoint to which said data service is routed is said intended receiving station if said response indicates acceptance of said data service.

27. An apparatus to originate a data service comprising:
a processor configured to generate a data service request, wherein said data service request includes an indication of a service delivery mode associated with said data service;
and a transmitter configured to transmit said data service request, and wherein said service delivery mode is one selected from the group consisting of:
a background service delivery mode,
a diagnostic service delivery mode,
a maintenance service delivery mode, and
a foreground service delivery mode.

28. An apparatus for receiving and processing a data service comprising:
a receiver configured to receive an indication of a delivery of said data service, wherein said indication includes a service delivery mode associated with the data service, and to receive said data service; and
a processor configured to process said data service in a manner based on whether the service delivery mode is a background service delivery mode, a maintenance service delivery mode, a diagnostic service delivery mode, and a foreground service delivery mode.

29. The apparatus as recited in claim 28 wherein said processor is further configured to not alert a user of said apparatus if said service delivery mode is a background service delivery mode, a maintenance service delivery mode, or a diagnostic service delivery mode.

30. The apparatus as recited in claim 28 wherein said receiver is further configured to receive instructions from a communication system from which said data service is received regarding not alerting a user of said apparatus about delivery of said data service;
wherein said processor is further configured to process said instructions; and
said apparatus further comprises a user-interface configured to provide data service information to and receive data service information from a user of said apparatus.

31. A data service apparatus comprising:
a receiver configured to receive an indication of a delivery of a data service, wherein said indication includes a service delivery mode associated with the data service, the service delivery mode being selected from the group consisting of a background service delivery mode, a maintenance service delivery mode, a diagnostic service delivery mode, and a foreground service delivery mode; and
a user-interface configured to alert a user of said apparatus upon receipt of said indication, and wherein said user-interface is further configured to receive a response to said alert from said user.

32. The data service apparatus as recited in claim 31 further comprising:
a transmitter configured to transmit said response to a communication system in which said data service apparatus operates.

33. The data service apparatus as recited in claim 31 further comprising: a transmitter configured to transmit an indication of said response to a communication system in which said data service apparatus operates.

* * * * *